United States Patent Office 3,128,303
Patented Apr. 7, 1964

3,128,303
FLUORALKYL ACID MALEATES
Robert L. Zimmerman, Midland, Mich., assignor to The Dow Chemical Company, Midland, Mich., a corporation of Delaware
No Drawing. Filed Mar. 5, 1962, Ser. No. 177,245
5 Claims. (Cl. 260—485)

This invention relates to new chemical compounds, which are fluoroalkyl acid maleates, and to a process for their preparation.

The compounds of the present invention have the formula:

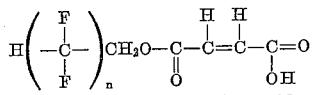

wherein $n$ is an integer from 1 to about 12.

The compounds of the present invention are conveniently prepared by reacting maleic anhydride or maleic acid with a fluoroalkyl carbinol having the formula:

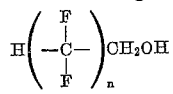

wherein $n$ is an integer from 1 to about 12. The reaction is suitably carried out at from about 20° to about 100° C., preferably at from about 40° to about 75° C., until substantially maximum conversion is achieved; normally from 10 to 40 hours are sufficient.

Although it is recognized that virtually any proportions of reactants will effect formation of some of the desired product, equimolar amounts of reactants are preferred.

The practice of the present invention is illustrated by a series of experiments, in each of which a fluoroalkyl carbinol was reacted at from 50–75° C. with a chemically equivalent amount of maleic anhydride. Then, the desired acid maleate was crystallized by cooling the vessel to room temperature. There are shown in Table I the fluoroalkyl carbinols used and the fluoroalkyl acid maleates obtained, together with their melting points.

Table I.—Fluoroalkyl Acid Maleates

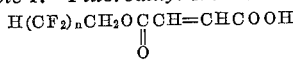

| Example | $n$ | M.P., °C. |
|---|---|---|
| 1 | 2 | 69 |
| 2 | 6 | 59–62 |
| 3 | 8 | 90 |
| 4 | 10 | 100 |

The acid maleates of the present invention possess valuable utility as anthelmintics. The novel compounds prepared in Experiments 1 to 4 were each evaluated for this utility by first infecting numerous test mice with pig ascarids and then feeding to the mice for several days a diet containing a minor proportion of the test compound, only one compound being fed to a particular test animal. The animals were then sacrificed and the tests evaluated according to the necropsy findings. The compounds prepared in Experiments 1, 2 and 4, when used in the concentration of 0.12 weight percent of the diet, showed an 80 percent kill of the pig ascarids, while the compound of Experiment 3, when used in a concentration of 0.06 weight percent of the diet, effected an 85 percent kill of the ascarids.

The compounds of the present invention, when employed in the form of their sodium or potassium salts, possess utility as low-foaming surfactants and as wetting agents.

I claim:
1. Fluoroalkyl acid maleate esters having the formula:

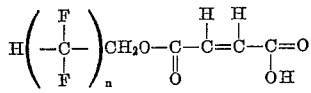

wherein $n$ is an integer from 1 to about 12.
2. 2,2,3,3-tetrafluoropropyl acid maleate.
3. 2,2,3,3,4,4,5,5,6,6,7,7-dodecafluoroheptyl acid maleate.
4. 2,2,3,3,4,4,5,5,6,6,7,7,8,8,9,9 - hexadecafluorononyl acid maleate.
5. 2,2,3,3,4,4,5,5,6,6,7,7,8,8,9,9,10,10,11,11 - eicosafluoroundecyl acid maleate.

References Cited in the file of this patent

UNITED STATES PATENTS

| 2,218,181 | Searle et al. | Oct. 15, 1940 |
| 2,778,850 | Barr et al. | Jan. 22, 1957 |

OTHER REFERENCES

Faurote et al.: Industrial and Engineering Chemistry, vol. 49, #2, pp. 189–191 (February 1957).